United States Patent
Ander et al.

(10) Patent No.: US 10,274,908 B2
(45) Date of Patent: Apr. 30, 2019

(54) SYSTEM AND METHOD FOR ALERTING A USER

(71) Applicants: Barbara Ander, Fort Worth, TX (US); Alexis Kashar, Scarsdale, NY (US)

(72) Inventors: Barbara Ander, Fort Worth, TX (US); Alexis Kashar, Scarsdale, NY (US)

( * ) Notice: Subject to any disclaimer, the term of this patent is extended or adjusted under 35 U.S.C. 154(b) by 544 days.

(21) Appl. No.: 14/252,216

(22) Filed: Apr. 14, 2014

(65) Prior Publication Data

US 2015/0198939 A1    Jul. 16, 2015

Related U.S. Application Data

(63) Continuation-in-part of application No. 14/153,411, filed on Jan. 13, 2014.

(51) Int. Cl.
*G05B 15/02*    (2006.01)
*G08B 7/06*    (2006.01)

(52) U.S. Cl.
CPC ............... *G05B 15/02* (2013.01); *G08B 7/06* (2013.01)

(58) Field of Classification Search
CPC . A61J 7/0481; A61J 2007/0436; G05B 15/02; G08B 21/009; G08B 21/22; G08B 21/0423; G08B 21/0446; G08B 21/0453; G08B 21/0461; G08B 21/0469; G08B 6/00; G08B 1/08; G04G 13/02; G04G 13/026; G04G 13/028; G04G 11/00; G04G 21/04; G04C 21/18
See application file for complete search history.

(56) References Cited

U.S. PATENT DOCUMENTS

| | | | |
|---|---|---|---|
| 4,365,238 A | 12/1982 | Kollin | |
| 4,853,674 A | 8/1989 | Kiss | |
| 5,251,253 A | 10/1993 | Chutuk | |
| 5,651,070 A | 7/1997 | Blunt | |
| 5,737,692 A | 4/1998 | Lang | |
| 5,809,112 A | 9/1998 | Ryan | |
| 5,867,105 A | 2/1999 | Hajel | |
| 5,917,420 A | 6/1999 | Gonzalez | |
| 6,118,375 A * | 9/2000 | Duncan | G08B 13/193 340/522 |
| 6,288,642 B1 | 9/2001 | Dohrmann | |

(Continued)

FOREIGN PATENT DOCUMENTS

| CN | 1755557 A | 4/2006 |
|---|---|---|
| CN | 101069363 A | 11/2007 |

(Continued)

OTHER PUBLICATIONS

International Search Report and Written Opinion of the International Searching Authority dated Jul. 16, 2015 from counterpart PCT App. No. PCT/US15/11080.

(Continued)

*Primary Examiner* — Adnan Aziz
(74) *Attorney, Agent, or Firm* — James E. Walton

(57) ABSTRACT

The system and method provides users with customized alerts that are unique to each user and environment through the use of an application in communication with a smart wireless signaling puck, the puck vibrates in response to alerts based on a customized vibration pattern from the smartphone and from time based commands stored in memory on the puck.

25 Claims, 5 Drawing Sheets

(56) References Cited

U.S. PATENT DOCUMENTS

| | | | |
|---|---|---|---|
| 6,369,312 B1 | 4/2002 | Komatsu | |
| 6,381,472 B1 | 4/2002 | LaMedica, Jr. et al. | |
| 6,384,724 B1 | 5/2002 | Landais | |
| 6,624,750 B1 | 9/2003 | Marman | |
| 6,831,974 B1 | 12/2004 | Watson et al. | |
| 6,867,688 B2 | 3/2005 | Lamb | |
| 6,950,019 B2 | 9/2005 | Bellone | |
| 6,980,088 B2* | 12/2005 | Stambaugh | E04H 3/04 340/286.09 |
| 7,015,807 B2 | 3/2006 | Roby et al. | |
| 7,042,338 B1 | 5/2006 | Weber | |
| 7,129,833 B2 | 10/2006 | Albert | |
| 7,148,797 B2 | 12/2006 | Albert | |
| 7,170,397 B2 | 1/2007 | Roby et al. | |
| 7,173,881 B1 | 2/2007 | Freudenberg, Jr. et al. | |
| 7,227,463 B2 | 6/2007 | Merrell | |
| 7,785,257 B2 | 8/2010 | Mack et al. | |
| 7,996,046 B2* | 8/2011 | Vargas | H04M 1/72533 455/550.1 |
| 8,115,091 B2* | 2/2012 | Brenner | G10H 1/0008 84/645 |
| 8,203,444 B2 | 6/2012 | Strohallen et al. | |
| 8,452,345 B2* | 5/2013 | Lee | G06F 3/016 340/407.1 |
| 8,489,065 B2* | 7/2013 | Green | G08B 13/19689 348/143 |
| 8,780,201 B1 | 7/2014 | Scalisi et al. | |
| 8,860,563 B2* | 10/2014 | Cruz-Hernandez | G06F 3/016 340/407.1 |
| 8,917,821 B2 | 12/2014 | Engelke et al. | |
| 8,923,804 B1* | 12/2014 | Aldridge, II | H04W 4/008 455/404.1 |
| 9,304,736 B1* | 4/2016 | Whiteley | G06Q 20/40145 |
| 9,659,577 B1* | 5/2017 | Langhammer | G10L 21/06 |
| 2002/0186618 A1* | 12/2002 | Kirkpatrick | G04G 13/026 368/11 |
| 2003/0067882 A1 | 4/2003 | Leung | |
| 2003/0117272 A1 | 6/2003 | Fegley et al. | |
| 2004/0168565 A1 | 9/2004 | Nagao et al. | |
| 2004/0219928 A1 | 11/2004 | Deeds | |
| 2004/0222879 A1* | 11/2004 | Sawyer | G08B 6/00 340/407.1 |
| 2005/0125541 A1* | 6/2005 | Frank | H04L 51/04 709/227 |
| 2005/0152325 A1 | 7/2005 | Gonzales | |
| 2006/0011042 A1* | 1/2006 | Brenner | G10H 1/0008 84/600 |
| 2006/0067165 A1 | 3/2006 | Chan | |
| 2006/0226973 A1* | 10/2006 | Catlin | G08B 17/10 340/539.11 |
| 2006/0234193 A1 | 10/2006 | Sahashi | |
| 2006/0276218 A1 | 12/2006 | Goris et al. | |
| 2006/0285652 A1 | 12/2006 | McClelland et al. | |
| 2007/0001825 A1 | 1/2007 | Roby | |
| 2007/0200716 A1* | 8/2007 | Haase | G08B 15/004 340/574 |
| 2007/0216537 A1 | 9/2007 | Park | |
| 2007/0229257 A1 | 10/2007 | Bliding et al. | |
| 2007/0299374 A1 | 12/2007 | Gesotti et al. | |
| 2008/0111677 A1 | 5/2008 | Kotz | |
| 2008/0143517 A1 | 6/2008 | Goffin | |
| 2008/0012716 A1 | 7/2008 | Saltzstein | |
| 2008/0267361 A1 | 10/2008 | Dileo | |
| 2009/0303031 A1* | 12/2009 | Strohallen | G08B 25/10 340/501 |
| 2009/0315488 A1* | 12/2009 | Shyu | H04M 19/04 318/114 |
| 2010/0039266 A1* | 2/2010 | Faris | G08B 21/24 340/572.4 |
| 2010/0060466 A1 | 3/2010 | Austin | |
| 2010/0087138 A1 | 4/2010 | Hedstrom | |
| 2010/0145167 A1 | 6/2010 | Im | |
| 2010/0148942 A1* | 6/2010 | Oh | G10L 21/06 340/407.1 |
| 2010/0195447 A1* | 8/2010 | George | G04G 21/00 368/13 |
| 2010/0330952 A1* | 12/2010 | Yeoman | H04M 1/72541 455/404.2 |
| 2011/0021147 A1 | 1/2011 | Tout | |
| 2011/0069769 A1 | 3/2011 | Brunolli | |
| 2011/0153197 A1 | 6/2011 | Song | |
| 2011/0267196 A1* | 11/2011 | Hu | A61B 5/0002 340/575 |
| 2012/0206237 A1* | 8/2012 | Lovegreen | H04Q 9/00 340/10.1 |
| 2012/0238319 A1* | 9/2012 | Lake | G08B 7/06 455/556.1 |
| 2012/0280790 A1 | 11/2012 | Gerhardt et al. | |
| 2012/0281057 A1* | 11/2012 | Couse | H04N 7/147 348/14.03 |
| 2012/0316456 A1* | 12/2012 | Rahman | G06F 1/163 600/547 |
| 2013/0040610 A1* | 2/2013 | Migicovsky | H04L 1/1867 455/412.2 |
| 2013/0043988 A1* | 2/2013 | Bruno | G04G 13/02 340/407.1 |
| 2013/0097038 A1* | 4/2013 | Potter | G06Q 30/00 705/21 |
| 2013/0100017 A1 | 4/2013 | Papakipos et al. | |
| 2013/0281169 A1 | 10/2013 | Coverstone et al. | |
| 2014/0064528 A1 | 3/2014 | Flood et al. | |
| 2014/0097953 A1 | 4/2014 | Jelveh et al. | |
| 2014/0106677 A1 | 4/2014 | Altman | |
| 2014/0108019 A1* | 4/2014 | Ehsani | G10L 21/06 704/275 |
| 2014/0172953 A1* | 6/2014 | Blanksteen | H04W 4/02 709/203 |
| 2014/0197946 A1 | 7/2014 | Park et al. | |
| 2014/0266571 A1* | 9/2014 | Sharma | G09B 21/003 340/4.12 |
| 2014/0313040 A1* | 10/2014 | Wright, Sr. | G08B 17/10 340/628 |
| 2014/0366273 A1* | 12/2014 | Davis, II | G04G 13/02 5/639 |

FOREIGN PATENT DOCUMENTS

| | | |
|---|---|---|
| CN | 101610599 A | 12/2009 |
| EP | 2134069 A1 | 12/2009 |
| WO | 0070779 A1 | 11/2000 |
| WO | 2012167098 A1 | 12/2012 |

OTHER PUBLICATIONS

International Preliminary Report on Patentability dated Nov. 9, 2015 from counterpart PCT App. No. PCT/US15/11080.

Ethan, Seth, and Jeff; "Baboomi: A Customizable and Comfortable Alarm";https://www.kickstarter.com/projects/215279222/baboomi-a-customizable-and-comfortable-alarm?ref=live; Sep. 27, 2013; 18 pages.

Greg Livadas; "Waking up may soon be a lot easier for deaf and hard-of-hearing individuals RIT/NTID students win $5,000 in 'The Next Big Id' innovation competition";http://www.rit.edu/news/story.php?id=50770#.U207Cd_fK9A.facebook; May 9, 2014; 2 pages.

Greg Livadas; "Sonic-connect™ USB Media Alert—On Sale Now"; http://www.chs.ca/products/sonic-connecttm-usb-media-alert; Apr. 29, 2014; 2 pages.

Patty Singer; "RIT students develop alarm clock for the deaf"; http://www.democratandchronicle.com/story/news/2014/05/24/rit-students-develop-alarm-clock-deaf/9547301/; 3 pages.

Office Action and Search Report from corresponding Chinese Application No. 201580013730.8, dated May 15, 2018.

Anonymous: "Nationwide launch of emergency alert system NL-Alert," News Item, Government.nl, Nov. 8, 2012, www.government.nl, from URL:https://www.government.nl/latest/news/2012/11/08/nationwide-launch-of-emergency-alert-system-nl-alert.

(56) References Cited

OTHER PUBLICATIONS

Article 34 Amendments dated Sep. 18, 2015 from corresponding PCT App. No. PCT/US15/11080.
Office Action from corresponding U.S. Appl. No. 14/153,411 dated Aug. 26, 2015.
Amendment from corresponding U.S. Appl. No. 14/153,411 dated Nov. 27, 2015.
Office Action from corresponding U.S. Appl. No. 14/153,411 dated Mar. 11, 2016.
Amendment from corresponding U.S. Appl. No. 14/153,411 dated Jun. 3, 2016.
Office Action from corresponding U.S. Appl. No. 14/153,411 dated Jul. 28, 2016.
Amendment from corresponding U.S. Appl. No. 14/153,411 dated Jan. 30, 2017.
Office Action from corresponding U.S. Appl. No. 14/153,411 dated Jun. 2, 2017.
Amendment from corresponding U.S. Appl. No. 14/153,411 dated Aug. 2, 2017.
Notice of Allowance from corresponding U.S. Appl. No. 14/153,411 dated Aug. 24, 2017.
Office Action from corresponding U.S. Appl. No. 15/088,669 dated Jul. 29, 2016.
Amendment from corresponding U.S. Appl. No. 15/088,669 dated Oct. 31, 2016.
Office Action from corresponding U.S. Appl. No. 15/088,669 dated Dec. 8, 2016.
Amendment from corresponding U.S. Appl. No. 15/088,669 dated Dec. 14, 2016.
Notice of Allowance from corresponding U.S. Appl. No. 15/088,669 dated Feb. 13, 2017.
Supplementary European Search Report from corresponding European Application No. 15735482 dated Apr. 3, 2018.

* cited by examiner

SYSTEM AND METHOD FOR ALERTING A USER

CROSS REFERENCE TO RELATED APPLICATIONS

This application is a continuation-in-part of U.S. application Ser. No. 14/153,411, filed 13 Jan. 2014, titled "Alarm Monitoring System," which is hereby incorporated by reference for all purposes as if fully set forth herein.

BACKGROUND

1. Field of the Invention

The present invention relates in general to the field of devices supporting those with the need to receive customized alerts in a variety of methods from a combination software application in conjunction with a wireless puck that vibrates in response to alerts from smart phones.

2. Description of Related Art

There are many designs of systems for alerting users of an event. Typically, a user sets an alarm on their phone or alarm clock and when the time is right, the alarm clock or phone will alert them to the event. While there are many systems for alerting users well known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
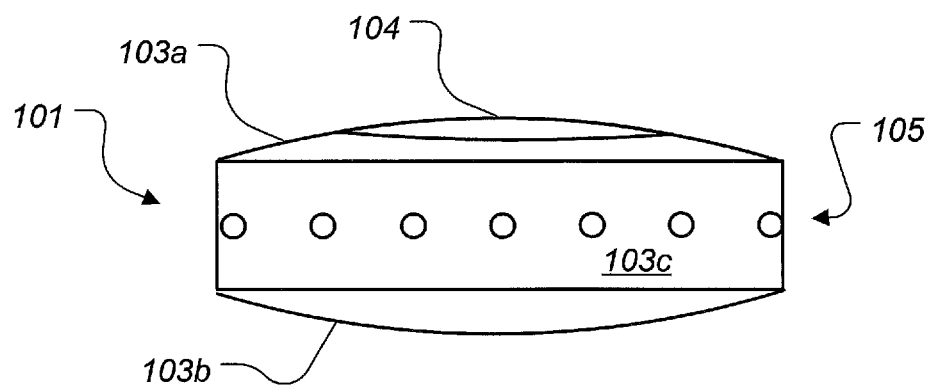
FIG. 1A is a side view of a preferred embodiment of an alerting apparatus according to the present application.

While the assembly of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the apparatus for alarm monitoring are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1A in the drawings, a preferred embodiment of an apparatus 101 for alerting a user according to the present application is illustrated. Apparatus 101 or puck 101 is preferably a circular shaped device suitable for being placed preferably adjacent a mattress to alert a user to a specified event. It should be apparent that other locations are suitable for use. For example a user carrying vibratory pad or puck 101 in their pocket is able to be notified of things that their phone couldn't notify them of. A user in a library places the puck 101 on a desk surface so that they can feel the alerts without disrupting other library visitors. A user in a car is provided with unique vibration to be alerted to things without regard to the amount of road noise by placing a puck 101 in a cup holder or in their lap. Puck 101 includes an upper surface 103a and a lower surface 103b. Where the upper surface 103a and the lower surface 103b meet is an outer surface 103c. Upper surface 103a includes a lid 104 that allows a user access inside the puck. For example, the user can remove the lid 104 to replace the power source or to change settings by flipping internally located switches. While a circular shape has been shown, it should be apparent that other shapes are contemplated by this application, including but limited to a square shape, a rectangular shape, both with and without rounded corners.

Puck 101 may include a series of lights 105 located on the outer surface 103c for providing visual alerts to users by flashing lights. The series of lights 105 are typically light emitting diodes (LEDs), however other types of lights are contemplated by this application. The lights 105 also provide configuration information to the user, for example if puck needs to be recharged, the lights 105 then display a specific color or pattern to indicate to the user that the puck needs to be recharged.

Figure 1B:
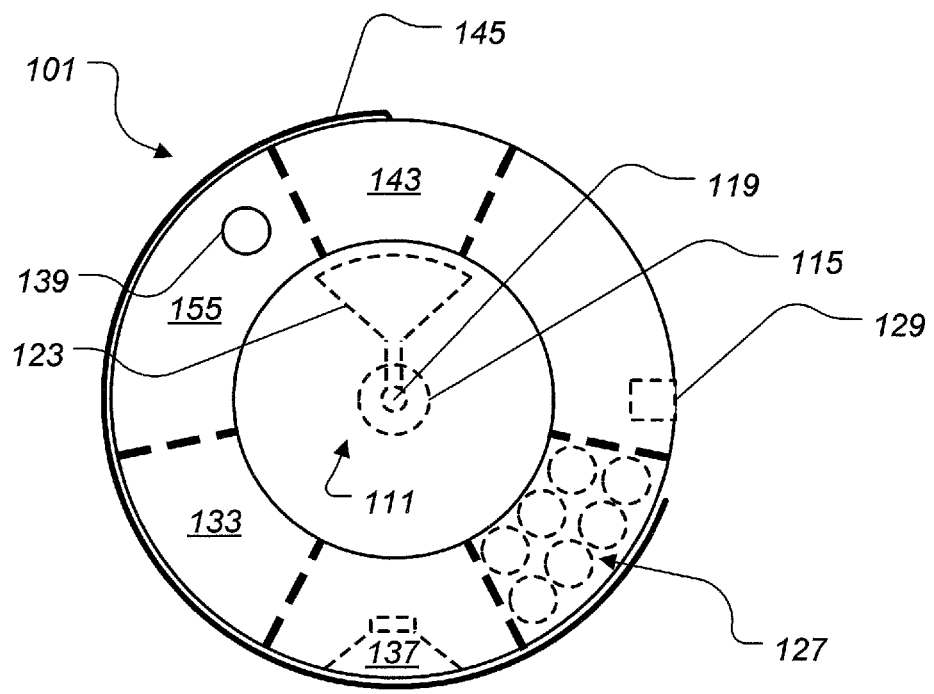
FIG. 1B is a top view of a preferred embodiment of an alerting apparatus according to the present application.

Referring now also to FIG. 1B in the drawings, a preferred embodiment of an apparatus 101 for alerting a user according to the present application is illustrated.

Located inside the puck 101 is a vibration system 111. Vibration system 111 includes an eccentric rotating mass system having a motor 115, a rotatable shaft 119, and a weighed member 123. Shaft 119 is mechanically coupled to the motor 115. Rigidly attached to the shaft 119 is the weighed member 123. When the motor 115 is commanded to spin, the motor causes the shaft 119 to spin. The spinning shaft 119 in turn causes the weighed member 123 to rotate relative to the puck 101 which produces a vibration in the puck 101. The amount of vibration can be adjusted by the speed and acceleration of the motor 115 along with the amount of weight and the balance of the weight in the weighed member 123. Other embodiments of the vibration system 111 include a linear resonant actuator with a weighted member, a piezoelectric crystal, and/or a stepper motor with a weighted member. In those embodiments with a linear resonant actuator the vibration system can provide feedback to the system by measuring the vibrations induced into the linear resonant actuator by the user handling the device, for example the user could stop the alert by shaking the puck 101.

In the preferred embodiment, the puck includes a rechargeable replaceable battery pack 127. The pack 127 provides the puck with power and is electrically coupled to the various electrical subsystems of the puck 101. In an alternative embodiment the weight in the weighed member 123 could be partial or completely comprised of a battery pack. This allows the puck to be smaller and weigh less because the weight of the required power storage unit can serve as the required weight for the weighed member 123. The vibration system would then need a slip ring (not shown) to electrically couple the rotatable battery to the electrical system. In the embodiment including a linear resonant actuator the weighted member battery would use a slackened wiring harness to electrically couple the battery to the rest of the system. Typically puck 101 includes a charging port 129 for electrically coupling an external charging device to the puck 101 for charging of battery pack 127. Charging port 129 is preferably a female micro universal serial bus adapter. Puck 101 includes a battery monitoring system configured for monitoring the rechargeable replaceable battery pack 127. The battery monitoring system provides visual and vibratory feedback to the user regarding the conditions of the rechargeable replaceable battery pack 127. The conditions of the rechargeable replaceable battery pack 127 include: the amount of stored energy in the rechargeable replaceable battery pack 127; the health of the battery cells in the rechargeable replaceable battery pack 127; and/or the need for replacement of the rechargeable replaceable battery pack 127. Visual feedback from the battery monitoring system includes flashing either a specific light, such as a red LED, or a pattern of flashing lights, such as a slow decrease in intensity. Vibratory feedback includes having the vibration system 111 produce a specific pattern of vibrations to alert the user to the conditions of the rechargeable replaceable battery pack 127.

Puck 101 includes a plurality of sensors 133 enabling the puck 101 to measure the environment located near the puck. The plurality of sensors 133 includes motion sensors, accelerometers, strain gages, touch sensors, thermocouples, breathing sensors, moisture sensors, and microphones. The sensor or sensors that measures noise include accelerometers, strain gages, potentiometers, and piezo-electric materials all configured to measure sound and the vibrations of sound such as crying, knocking, yelling, glass breaking, and shouting. The motion sensor allows the puck 101 to register that the user is moving in close proximity to the puck. This allows a user to interact with the puck 101 without actually having to touch the puck 101. The accelerometers allow the puck to measure the amount of movement of the puck relative to a coordinate system. For example, the puck 101 can measure the motion of the mattress it is adjacent to by measuring accelerations of the puck 101. This provides the puck 101 with a feedback loop that the alerts are starting to awaken the user. The strain gages are used by the puck 101 to measure the force applied to the puck similar to a touch sensor or to allow the user to interact with the puck. For example, the harder a user compressed the puck 101 as measured by the strain gages increases the amount of alerting by the puck 101. An alternative embodiment of puck 101 includes a global positioning system for positional data, this reduces the likelihood of the puck being lost, and also it provides the software application with location information to tie the other sensor output with. Puck 101 is able to communicate with sensors outside of the puck 101. For example, the user could have a sensor, mounted to their door, for detecting knocking and that sensor can cause the puck 101 to vibrate to a specific pattern and/or flash a pattern of lights.

Puck 101 includes a speaker 137 to allow the puck 101 to generate audible alerts. Puck 101 includes a switch 139 that allows a user to acknowledge an alert or activate a snooze from the puck 101 by depressing the switch 139. While the switch has been indicated on the top of the puck, it should be apparent that the switch could be located on other surfaces of the puck 101 or recessed into a surface to prevent accidental activation of the switch. Furthermore, it should be apparent that multiple switches could be used, for example the outer surface 103*c* or other surfaces could be a pressure sensitive switch enabling the user to merely touch the puck 101 to acknowledge the alert. Alternatively, a strain gage is used in addition or in place of switch 139. Strain gage measures between the upper surface 103*a* and outer surface 103*c* and or lower surface 103*b* and outer surface 103*c*. This allows a user to twist or torque the puck 101 slightly to acknowledge the alert. Preferably switch 139 only functions after the puck has vibrated for a set period of time to reduce unintended hiatuses of the alerts.

Puck 101 includes a communication system 143. In the preferred embodiment the communication system includes a radio transmitter, a radio receiver, and electrical antennas, such as antenna 145, coupled to them in order for the puck 101 to send and receive wireless information. The preferred wireless configuration provides the puck 101 with the ability to communicate via a Bluetooth adapter to other Bluetooth enabled devices via the Bluetooth, however other wireless configurations are contemplated by this application. For example, the puck, in other embodiments with other wireless protocols, includes a cell phone receiver and transmitter with a SIM card and/or a WIFI interface so that the puck 101 can connect to the global Internet. The communication system 143 allows the puck 101 to be in electrical communications with external devices such as smart phones, computers, controllers, and external sensors. Communication system 143 provides the puck 101 with a handshaking system to the smart device. The handshaking or paring of puck to smart device prevents unauthorized users access to the puck 101.

Controller 155 is electrically coupled to the various subsystems of the puck 101 including the communication system 143, the speaker 137, switch 139, and the plurality of sensors 133, rechargeable replaceable battery pack 127, the charging port 129, the lights 105, and the vibration system 111. Controller 155 takes commands from the smart device via the communication system 143 to activate the vibration system 111, the lights 105, and the speaker 137. Controller activates the lights 105 to indicate the rechargeable replaceable battery pack 127 needs to be recharged or replaced. Lights 105 in an alternative embodiment include a red light as a low battery indicator and a blue light for indication of a wireless link between the puck 101 and the smartphone. A smart phone or smart device includes a screen for displaying information to a user, a processor, local data storage on the smart phone, a wireless interface for connecting the smart phone with other devices on a network, and a wireless interface for connecting the smart phone to the puck 101, and an alerting system for receiving notifications from the smart phone and others across the network. The notifications or alerts could be in the form of text messages, timers, alarms, pushed events, calendars updates, emails, social media notifications such as Facebook and Twitter updates, phone calls, video chats, emergency alerts, and weather alerts. An alternative embodiment includes non-volatile memory for storage of events, alerts, timers, vibration patterns so that the puck 101 can alert a user in the case the smart device is turned off or the wireless communication system is not functional.

Figure 2A:
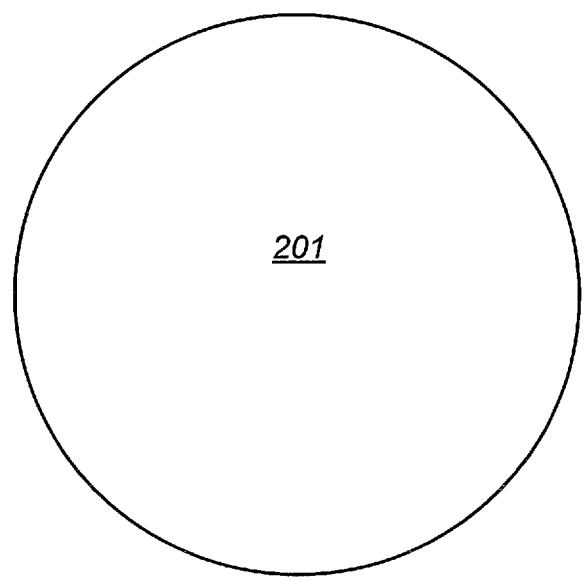
FIG. 2A is a side view of an alternative embodiment of an alerting apparatus according to the present application.
Figure 2B:
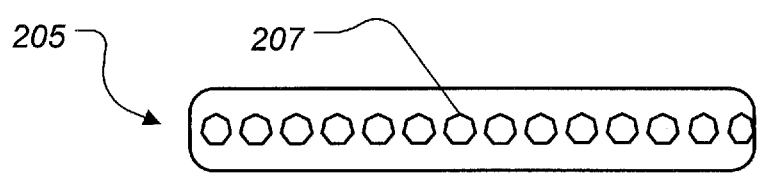
FIG. 2B is a top view of an alternative embodiment of an alerting apparatus according to the present application.

Referring now also to FIGS. 2A and 2B in the drawings, alternative embodiment of an apparatus 201 for alerting a user according to the present application are illustrated. Puck 201 is similar to puck 101 with the similar battery, similar sensors, similar communication system, and similar controller with memory. Puck 201 in contrast to the puck 101 is designed to be a smaller unit with less maintainability than puck 101. The battery of puck 201 is not readily replaceable by the user. Furthermore, the battery of puck 201 is charged by wireless induction of power without use of a plug located on the puck 201. Without having a charging port on the puck 201, the likelihood of moisture invasion of the puck is greatly diminished.

Puck 201 includes a plurality of light emitting diodes (LED) 205 arranged around the outside edge of the puck. Typically, each LED 207 is comprised of three individual LED each with their own color. Typically, there is a red, green, and blue LED closely packed into a single LED 207. Having the ability for the puck 201 to individually control each color of each LED 207 allows the puck to produce a variety of optical patterns of various colors in response to various events. For example, the more important the event, the brighter the intensity of the LED's 205. Additionally, the pattern of lights can be made to match the pattern of vibrations from the integral shaker of puck 201.

While single pucks have been illustrated, it should be apparent that multiple pucks can be combined into a single system. This allows a single smart device to set alerts for multiple pucks. For example, a mother could set alerts from her smart phone for herself and her three children, each having their own pucks. Since each would get a different alert they would not have to be woken up at the same time as would be the likely result of a single alarm clock for three children. A combined base would allow a user to charge multiple pucks concurrently. In addition to the multiple pucks, the smart device can be programmed to activate alarms on Bluetooth or Wi-Fi enabled clocks with speakers, lights, and or displays for messages. This feature provides the user with the ability to coordinate a group of alarms and devices. For example, a mother could set alerts from her smart phone for herself and her three children, each having their own pucks and an alert for her husbands Bluetooth clock to sound at 3:00 pm to start dinner. This feature prevents the user from having to go to several devices separately and set several alarms.

Figure 3:
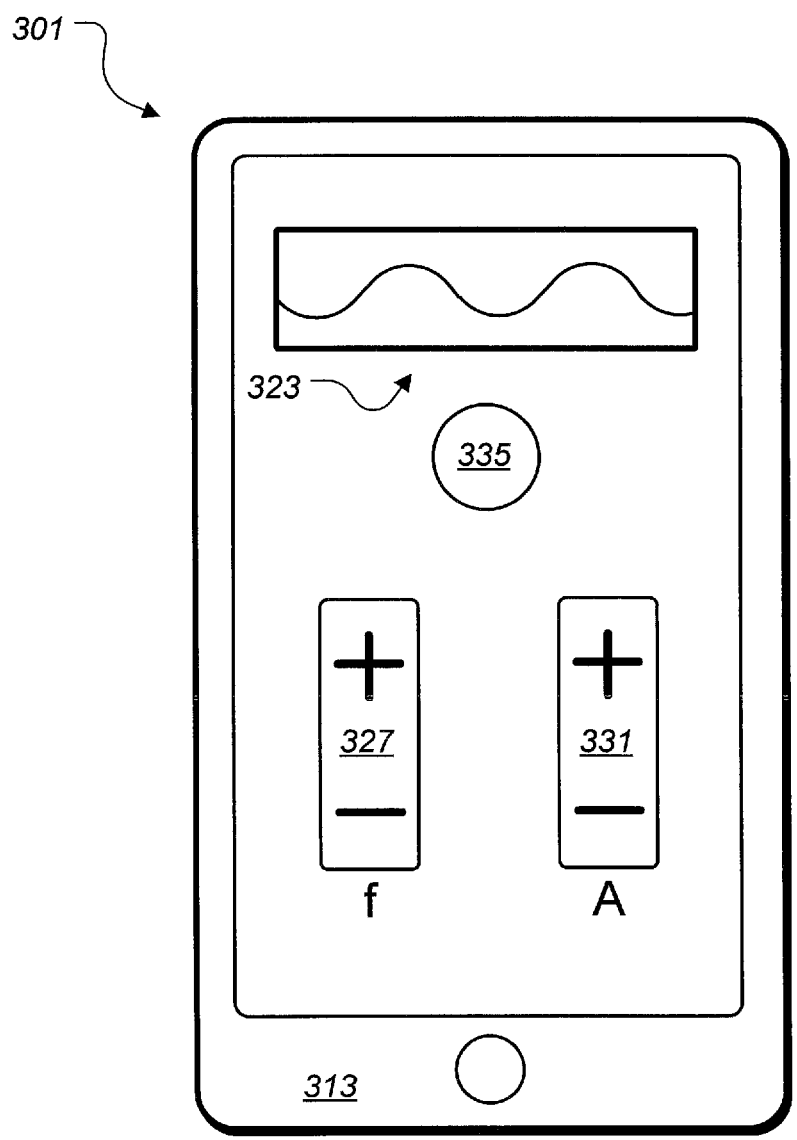
FIG. 3 is a perspective view of a preferred embodiment of a software application according to the present application.

Referring now also to FIG. 3 in the drawings, a preferred embodiment of a software application 301 on smart device 313 according to the present application is illustrated. To interface with the puck 101, software application 301 allows a user to select events, times, alerts, triggers, and such, so that the puck alerts the user to the various events as programmed by the user and the users friends and family. As shown, the software application 301 is programmed to be executed on a smartphone 313, however it should be apparent that other devices such as tablets, computers, smart televisions, smart watches, and such are able to be paired with the puck 101 and be properly interfaced with it.

Software application 301 includes the ability by the user to adjust the event triggering the alert and the type of alert. Possible events for triggering alerts include time based events, remote sensors, emails, text messages, social media alerts, phone calls, messages from fire alarms, messages from smoke alarms, and messages from carbon monoxide alarms. Alerts are based upon both internal events and external events. Internal events are alerts set by the user on the smart device. External events are alerts sets from sources external to the smart device such as emails, text messages, instant messages, social media updates, etc. In conjunction with a listening device, the software application 301 can trigger an alert based upon audible inputs, such as a ringing phone, a fire alarm sounding, a smoke alarm sounding, a carbon monoxide alarm sounding, a radon gas alarm sounding, shouting by a person, snoring, knocking, screaming, crying, etc. Software application 301 allows a user to set a plurality of events related to the various alerts and then configure which methods of alerting are appropriate for each event. Software application 301 includes the ability of the user to import contacts and calendars for triggering alerts. For example, the user sets a single 3 second light vibration for each time the software application 301 registers a text message and also configures software application 301 to generate the biggest vibration along with loud sounds and bright flashing lights in response to the software application 301 registering a fire alarm was triggered or a severe-weather alert. Additionally, the software allows a user to only generate events if the message was from a known contact, such as a relative, to reduce erroneous alerts from spam and such. Since the smart device is connected to other devices such as smart phones, other individuals could send text messages to vibrate the puck at inconvenient times for the user, such as at 2:30 am. Software application 301 includes the ability for users to set custom notifications. Custom notifications include rules for allowing and blocking messages, texts, and phone calls from certain contacts and people to vibrate the puck 101. The user would create a list of people or types of alerts in the software application 101, the list would be used by the software application 301 to only allow messages, texts, and calls from people on the list or certain types of alerts to vibrate the puck 101 and block those alerts from anyone not on the list. In conjunction with the list, the user could set up a time to allow certain messages, texts, and calls from those on the list and those off the list to vibrate the puck. These custom notifications prevent unwanted access to the puck 101 from strangers and from allowing certain people from unnecessarily waking the user.

Software application 301 includes a visual representation 323 of vibration output of the puck 101. Visual representation 323 provides a user with the ability to visual see the vibration pattern or the expected vibration output over a time period. The user can customize the vibration pattern by adjusting: the duration of the vibration output of the puck, including the start time, stop time, snooze amount, intensity, duration of the vibration. Furthermore, the user can make the pattern repeat, ramp up, ramp down, a square pattern, a sinusoidal pattern, a saw pattern, etc. For example, the user can set the puck 101 to produce minimal vibrations at the start of the alert but as time passes the intensity of the vibration is increased in response to the passing of time. Software application 301 allows a user to manually adjust the frequency 327 and the amplitude 331. Icon 335 is a representation of the puck 101 on the display of the smart device 313. As the user adjust the vibratory output of the puck, the smart device 313 can activate the vibration feature of the smart device 313 to give the users a physical representation of the expected output of the puck 101. Furthermore, the icon 335 displays the quality of the wireless connection between the smart device 313 and the puck 101. This feature allows the user and the system to realize the puck is not in communication with the smart device 313.

This prevents a user from missing an alert because the puck is out of range or out of charge. The smart device can be configured to prevent an alert from being set if no puck 101 is connected or if no alert can stored in the memory of the puck itself. Additionally, if the connection with the puck 101 is corrupted or lost, the smart device will alert the user of the lost connection.

Preferably the software application 301 sets the configuration for puck 101 and doesn't need to remain in communications with the puck for certain events. Therefore, if the smart device is unavailable the puck would still alert the user to the specified event. The configuration information sent to the puck 101 includes at least: when to alert, the type of alert; and the duration of alert. Alternatively, the puck 101 only vibrates in direct response to commands from the software application 301 running on the smart device 313.

Figure 4:
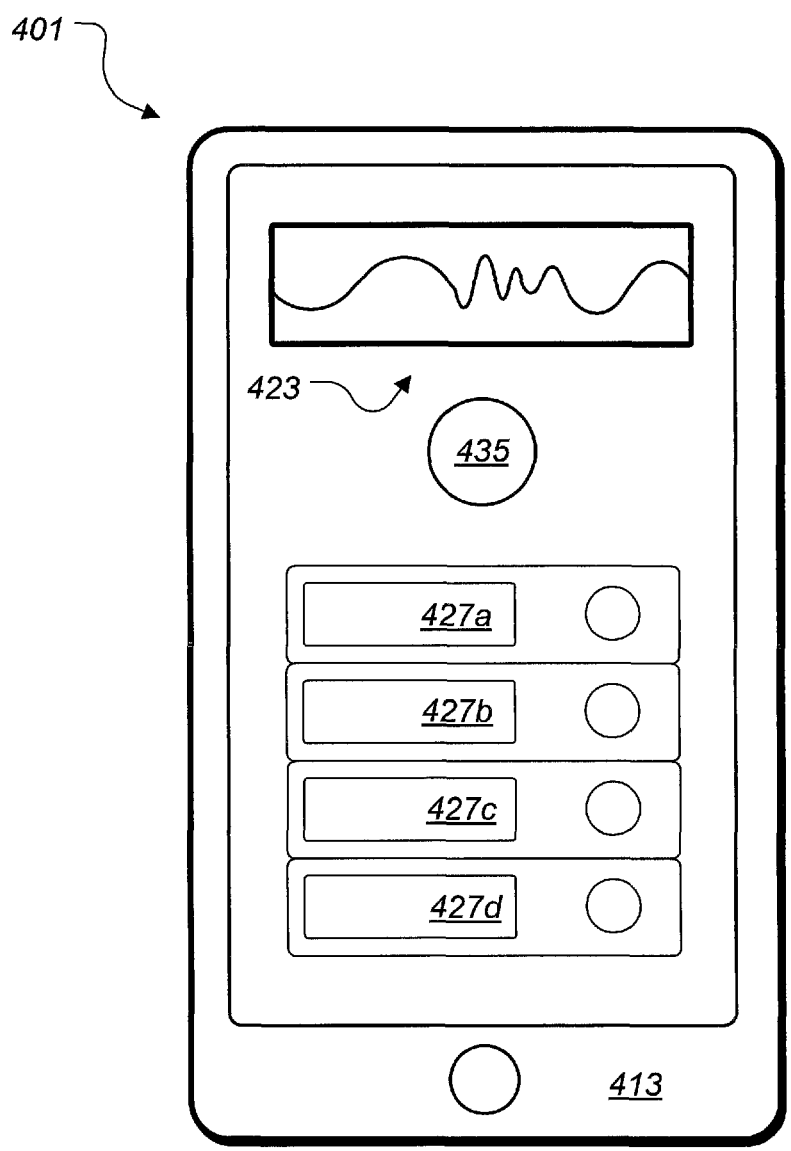
FIG. 4 is a perspective view of a alternative embodiment of a software application according to the present application.

Referring now also to FIG. 4 in the drawings, an alternative embodiment of a software application 401 on smart device 413 according to the present application is illustrated. Software application 401 includes a visual representation 423 of vibration output of the puck 101. If the user has music stored on the smart device 413, the software application 401 gives the user the ability to select tracks of music from the stored music on the smart device 413, such as track A 427a, track B 427b, track C 427c, or track D track 427d. The user can scroll through a listing of their music and select the track to replicate in a vibration pattern that is compatible with the vibration system of puck 101. The system can then apply the musical waveform to the vibratory waveform such that output of the vibration system of the puck 101 is similar in beat to that of the selected music track. Additionally, the system is able to pattern vibratory patterns based upon musical notes or other patterns. For example, the system can convert a digital music file from an audible form into a sensory form. This process converts the frequencies of the audible file from their high frequencies, such as 500 Hz-20,000, into low frequencies, such as 1-500 Hz. Therefore, the user can feel the pattern of the song as opposed to hear it. Icon 435 is a representation of the puck 101 on the display of the smart device 413.

An alternative embodiment of puck 101 includes the ability of the user to adjust the duration, intensity, and the pattern of the vibration. Furthermore, the user is able to program the puck 101 via the smart device 413 with a specific pattern in response to a specific alert. For example, the user would typically set the vibration to max intensity, duration, and an abrupt on-off pattern repeating indefinitely for a fire alarm. The user would then reduce the intensity and duration and make the pattern less abrupt for alerting them that a visitor was at a door knocking. Additionally, the system is able to utilize a feedback loop to determine how best to wake a user based upon their sleep cycle. The system utilizes the variety of sensors to measure the sleep pattern of the user. Typically, the system measures the user's restlessness with motion sensors, potentiometers, accelerometers, strain gages, and the temperature of the user with thermocouples. This also provides the system with the ability to check if the user is awakening in response to the vibrations. The system can modify the vibrations intensity to awaken the user if a lower setting doesn't appear to be working after a period of time. Typically, the system is programmed via a smartphone or tablet by way of a computer based software application. Additionally, the system can share data with enuresis or sleep apnea equipment to provide conditional information to the sleep apnea machine, as well as, receive a signal from the sleep apnea machine to alert the user with a specific vibration.

Figure 5:
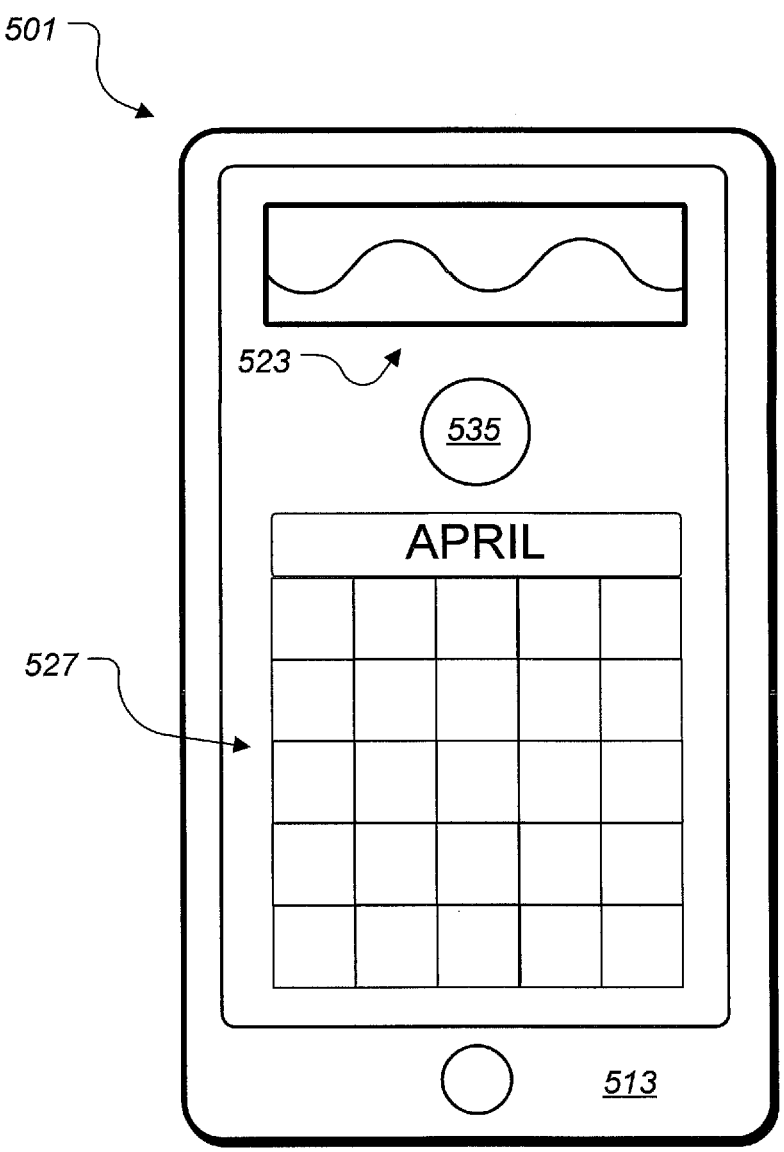
FIG. 5 is a perspective view of a alternative embodiment of a software application according to the present application.

Referring now also to FIG. 5 in the drawings, an alternative embodiment of a software application 501 on smart device 513 according to the present application is illustrated. Software application 501 includes a visual representation 523 of vibration output of the puck 101. The user of software application 501 can base alert on their calendar 527. Preferably calendar 527 is imported from their cloud based calendar and allows the user to remotely set the software application 501 to vibrate from an appointment set remotely to the smart device 513. The user is able to set different patterns for the different types of alerts. For example a text message alert might be shorter with less intensity and an alarm might be longer duration with maximum intensity. Software application 501 includes an icon 535 that is virtual representation of the puck 101 and vibrates as the puck 101 vibrates. Software application 501 is configured to allow a user to adjust the snooze settings, the time zone settings, repeat alerts and alarms, the type of waking, the duration, the gradients, and emergency alert responses. The software application 501 is integrated with other software on the smart device 513. If the smart device receives a phone call the software application 501 sends a predetermined vibration to the puck 101. Specific contacts from the smart device 513 are given specific vibration patterns from the software application 501. The software application 501 could be of several different versions, such as a free version and a paid version, with various levels of features enabling the manufacturer the ability to customize the software to the type of customer.

The software application 501 provides the user the ability to select exactly how the puck 101 will react to the alerts. The user can select whether the puck 101 will vibrate, flash, and sound an audible alarm based at least on the type of alert, the urgency of the alert, the time of the alert, what to do if the alert is not acknowledged in a certain period of time, the source of the alert. Furthermore, the user can customize the vibrations, the flashing, and the sounds based at least on the type of alert, the urgency of the alert, the time of the alert, what to do if the alert is not acknowledged in a certain period of time, and or the source of the alert.

The systems and methods described above provide several distinct advantages over previous alerting systems. The system provides a user with a convenient alerting system that provides feedback to the system and is aware of the conditions in the environment surrounding the user of the puck, and the information being received in real time into the smartphone/computer/tablet control device. The system provides the user with a method of customizing the type of alert. Additionally, the system can customize the alerts to each specific user.

It is apparent that an assembly with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system for alerting users comprising:
   a smart device for controlling alerts, the smart device having;
      a screen for allowing users to input a first alert and a second alert and selecting a first vibratory pattern in response to the first alert and selecting a second vibratory pattern in response to the second alert; and
      a first wireless system;
   a first puck having;
      an outer surface comprising;
         a series of lighting elements facing radially outward from the outer surface of the first puck;
      a second wireless system for interfacing with the smart device via the first wireless system;
      a vibration system configured for shaking the first puck;
      a feedback sensor; and
      a controller for activating the vibration system in response to a signal from the smart device and for activating the series of lighting elements in response to the signal from the smart device;
   wherein the controller measures an amount of movement of the first puck relative to a coordinate system based upon the feedback sensor; and
   wherein the series of lighting elements is comprised of at least two different colored light emitting diodes.

2. The system according to claim 1, wherein the vibration system includes a rotating mass system.

3. The system according to claim 1, wherein the vibration system includes a linear resonant actuator system.

4. The system according to claim 1, wherein the smart device is configured for selectively limiting alerts from sources outside the smart device.

5. The system according to claim 1, the first puck further comprising:
   memory coupled to the controller, configured for storage of alerts so that the controller can activate the vibration system without being continuously connected to the smart device.

6. The system according to claim 1, the first puck further comprising:
   a switch located on the first puck, the switch for acknowledging alerts.

7. The system according to claim 1, wherein the smart device is configured for changing a musical track into a vibratory pattern for the vibration system; and
   wherein the smart device shifts a frequency of the musical track.

8. The system according to claim 1, further comprising:
   an acoustic sensor located outside the first puck;
   wherein the acoustic sensor is in communications with the system for alerting users;
   wherein the vibration system is activated in response to a signal from the acoustic sensor; and
   wherein the series of lighting elements flash in unison with the pattern of vibration.

9. The system according to claim 1, further comprising:
   at least a second puck having;
      a third wireless system for interfacing with the smart device via the first wireless system;
      a second vibration system configured for shaking the second puck; and
      a second controller for activating the second vibration system in response to a second signal from the smart device;
   wherein the screen allows the users to input an identical alert having a third vibratory pattern in response to the identical alert; and
   wherein the smart device controls the first alert and the second alert for both the first puck and the second puck.

10. The system according to claim 1, further comprising a global positioning system.

11. The system according to claim 1, wherein the feedback sensor is an accelerometer.

12. A puck for alerting users comprising:
    a plurality of lighting elements located on a peripheral edge of the puck;
    a communication system for interfacing with a smart device;
    a vibration system configured for shaking the puck based upon a vibration pattern;
    a feedback sensor; and
    a controller for activating the vibration system in response to a signal from the communication system;
    wherein the controller measures an amount of movement of the puck relative to a coordinate system based upon the feedback sensor;
    wherein the smart device allows users to customize the vibration pattern; and
    wherein the plurality of lighting elements are arrayed around the peripheral edge of the puck;
    wherein the plurality of lighting elements is comprised of at least a first light emitting diode having a first color; and
    wherein the plurality of lighting elements is further comprised of at least a second light emitting diode having a second color.

13. The puck according to claim 12, wherein the vibration system includes a linear resonant actuator system.

14. The puck according to claim 12, wherein the feedback sensor is an accelerometer.

15. The puck according to claim 12, further comprising:
    memory configured for storage of alerts so that the controller can activate the vibration system without use of the communication system.

16. A method for alerting a user comprising:
    providing a device having a software application;
    setting an internal alert on the device;
    providing a puck having at least one feedback sensor for providing sensor information;
    establishing a communication channel between the device and the puck;
    checking the communication channel between the device and the puck;
    alerting the user if the communication channel between the device and the puck fails;
    providing at least a first light emitting diode having a first color on the puck; and
    providing at least a second light emitting diode having a second color on the puck;
    providing the puck with a GPS system for providing location information to the software application, wherein the software application ties the location information with the sensor information;
    programming the puck to vibrate in response to the internal alert based upon a vibration pattern;
    vibrating the puck in response to the internal alert; and
    providing the puck with a feedback loop for adjusting the vibration pattern in response to the sensor information;
    wherein the device allows a user to customize the vibration pattern associated with the internal alert.

17. The method according to claim 16, further comprising:
creating a list of contacts;
establishing a rule to limit external alerts from outside the device based upon the list of contacts;
receiving an external alert from an external source having a sender;
setting the external alert on the device if the sender of the external alert is on the list of contacts; and
ignoring the external alert if the sender of the external event is not on the list of contacts.

18. The method according to claim 16, further comprising:
importing a calendar from the device;
wherein setting the internal alert is based on information imported from the calendar.

19. The method according to claim 16, further comprising:
importing a musical track;
shifting a frequency pattern of the musical track;
creating a music based vibration pattern based upon the frequency pattern of the musical track; and
adjusting the vibration of the puck in response to the music based vibration pattern.

20. The method according to claim 19, further comprising:
adjusting the frequency pattern of the musical track to a puck compatible frequency pattern.

21. The method according to claim 16, further comprising:
ending the vibrations from the puck by activating a switch on the puck.

22. The method according to claim 16, further comprising:
flashing the first light emitting diode located on a surface of the puck in response to the internal alert; and
wherein the flashing of the first light emitting diode matches the vibration pattern associated with the internal alert.

23. A system for alerting users comprising:
a smart device for controlling alerts, the smart device having;
a screen for allowing users to input a first alert and a second alert and selecting a first vibratory pattern in response to the first alert and selecting a second vibratory pattern in response to the second alert; and
a first wireless system;
a first puck having;
an outer surface comprising;
a series of lighting elements facing radially outward from the outer surface of the first puck;
a second wireless system for interfacing with the smart device via the first wireless system;
a vibration system configured for shaking the first puck;
a controller for activating the vibration system in response to a signal from the smart device and for activating the series of lighting elements in response to the signal from the smart device; and
a feedback sensor;
wherein the controller measures an amount of movement of the first puck relative to a coordinate system based upon the feedback sensor.

24. The system according to claim 23, further comprising a global positioning system.

25. The system according to claim 23, wherein the feedback sensor is an accelerometer.

* * * * *